US005458349A

United States Patent [19]

Mung-Tung

[11] Patent Number: 5,458,349

[45] Date of Patent: Oct. 17, 1995

[54] MULTI-FUNCTION ELECTRIC WHEEL-CHAIR

[76] Inventor: Wang Mung-Tung, 105 Kuang-Ming Rd., Wu-Jih Shiang, Taichung County, Taiwan

[21] Appl. No.: 269,873

[22] Filed: Jun. 30, 1994

[51] Int. Cl.[6] .............................. A61G 5/14; B62M 1/14

[52] U.S. Cl. ........................ 280/250.1; 180/6.5; 180/907; 280/304.1; 297/DIG. 10

[58] Field of Search .................................... 180/6.5, 65.5, 180/68.5, 907; 297/DIG. 4, DIG. 10; 280/250.1, 304.1

[56] References Cited

U.S. PATENT DOCUMENTS

| | | | |
|---|---|---|---|
| 5,096,008 | 3/1992 | Mankowski | 180/6.5 |
| 5,346,280 | 9/1994 | Deumite | 297/DIG. 10 |

FOREIGN PATENT DOCUMENTS

| | | | |
|---|---|---|---|
| 77280 | 4/1983 | European Pat. Off. | 297/DIG. 10 |

*Primary Examiner*—Mitchell J. Hill
*Attorney, Agent, or Firm*—W. Wayne Liauh

[57] ABSTRACT

A multi-fumction electric wheel-chair is disclosed which comprises: a main frame foundation having two rollers, a front portion, a back portion; a chair-like sitting block placed above the main frame foundation, the sitting block comprising a backing plate, a sitting plate and two arm-rest plates; a drive-gear is placed under a rear part of the sitting block; two pedal-rods placed in front of the sitting block which are symmetrically hinged to a front part of the sitting plate. The multi-function wheel-chair is characterized in that: two L-shaped supporting rod, each having an upper part which curved upwards; the chair-like sitting block is hinged to the backing plate, the backing plate has a back part which is hinged to the upper parts of the two L-shaped supporting rod which curve upwards; the L-shaped supporting rod is placed under the sitting plate and parallels to the sitting plate; the front end of the L-shaped supporting rod is hinged to a vertical rod of a beam column on the frame foundation; an extended supporting rod, which extends downwardly on the front of two symmetric sides of the sitting plate, is hinged to an upper flank of the front portion of the main frame foundation; a transverse worm of a drive-gear which is placed in a bearing pedestal placed on the back portion of the main frame foundation, the transverse worm is driven by a motor; a worm-gear which is placed in a gear-box of two extended parts which are extended from the transverse worm; two inclined screw control racks with spiral thread are placed inside an inner hole of the worm-gear, each of the screw control racks has an upper end which is hinged to a middle of a side rod, which is joined into a flank of the sitting plate.

7 Claims, 5 Drawing Sheets

MULTI-FUNCTION ELECTRIC WHEEL-CHAIR

FIELD OF THE INVENTION

This type of new practical wheel-chair, is a non-motorized multi-function vehicle, which especially services the disabled.

BACKGROUND OF THE INVENTION

At present, the wheel-chair provided to the disabled or the patient in the hospital usually consists of the frame foundation and the sitting block which is fixed to the frame foundation, the chair is equipped with two small wheels under the front of the frame foundation, and two big wheels at the back, when walking, the disabled turns both auxiliary wheels beside the big wheel with both hands and the big wheels roll as the auxiliary wheel is turned round so that the wheel-chair can move same time the big wheel is rotated, so that the disabled can travel up hill.

This kind of motorized wheel-chair has the following disadvantages:

1. It is used for walking and can provide only one kind of a fixed sitting posture. Because the sitting block of the chair is fixed to the frame foundation, and resembles a fixed chair, the user can sit on it with only one posture. During long periods of time, the load on the user's lower body might be aggravated and his blood may not flow fluently. It's also easy to cause body malformation.

2. The disabled or the patient in the hospital can not be cared for by a nurse every minute. Some patients need to do simple tasks, such as standing up to get something or leaning backwards to rest. Because the sitting posture of the present wheel-chair for the handicapped can not be adjusted, both the patient and nurse have many troubles.

3. When the convalescent patient or the lower-limb-cripple sits in the same place for long periods of time it is easy to get bedsores in the summer. This causes the convalescence to be prolonged and other diseases to occur.

4. It is difficult for the sitter to stand with a cane from the sitting position. Because the position can not be adjusted smoothly, the sitter must render some action from one kind of posture to the other, but the patient can not stand with a cane with numb legs.

SUMMARY OF THE INVENTION

In order to overcome the technical disadvantages mentioned above, we invented a practical and safe, electric, multi-function wheel-chair which provides a sitting block with variable inclination.

This new type of practical whet-chair is realized by the following technical project: the chair-like sitting block is piecemeal hinged to the backing plate, and the inclination is adjustable, the back part of which is hinged to the upper parts of two rods curved upwards of the two "L-shape" supporting rods placed symmetrically; the "L-shape" supporting rod is placed under the sitting plate and parallels to it; the front end of supporting rod is hinged to the vertical rod of the beam column on the frame foundation; the transverse worm of the drive-gear is placed in the bearing pedestal placed on the back of the main frame foundation; the transverse worm is driven by the motor M, the worm gear gearing into the transverse worm is placed in the gear-box of the two parts which are extended from the transverse worm; there are two inclined screw control racks which fall into the worm-gear's inner hole with a spiral thread; when the motor drives in worm-gear, the transverse worm can be driven by the worm-gear and make the screw control rack outstretch or retract, so that the sitting posture can be changed.

From the above, we can see the outstanding features of the new practical wheel-chair. They are as follows:

1. The screw control rack is hinged with the sitting block that consists of piecemeal-jointed parts. Because of such a design, the shape of the support of the sitting block can be changed according to the variable sitting posture that is desired.

2. The wheel-chair mentioned above is convenient for the sitter, enabling him to change his sitting, standing or leaning posture from one to another. This not only brings convenience and comfort to the sitter, but also reduces the difficulty of nursing and is profitable for the patient's recovery.

3. The sitting posture can be adjusted conveniently and the patient can change the posture according to the desired conditions. The changing of the sitting posture can safely and smoothly be acquired.

BRIEF DESCRIPTION OF THE DRAWINGS

Detailed structures of this type of new and practical wheel-chair are demonstrated by the following examples as in FIG. 1 to FIG. 8.

DETAILED DESCRIPTION OF THE PREFERRED EMBODIMENTS

Figure 1:
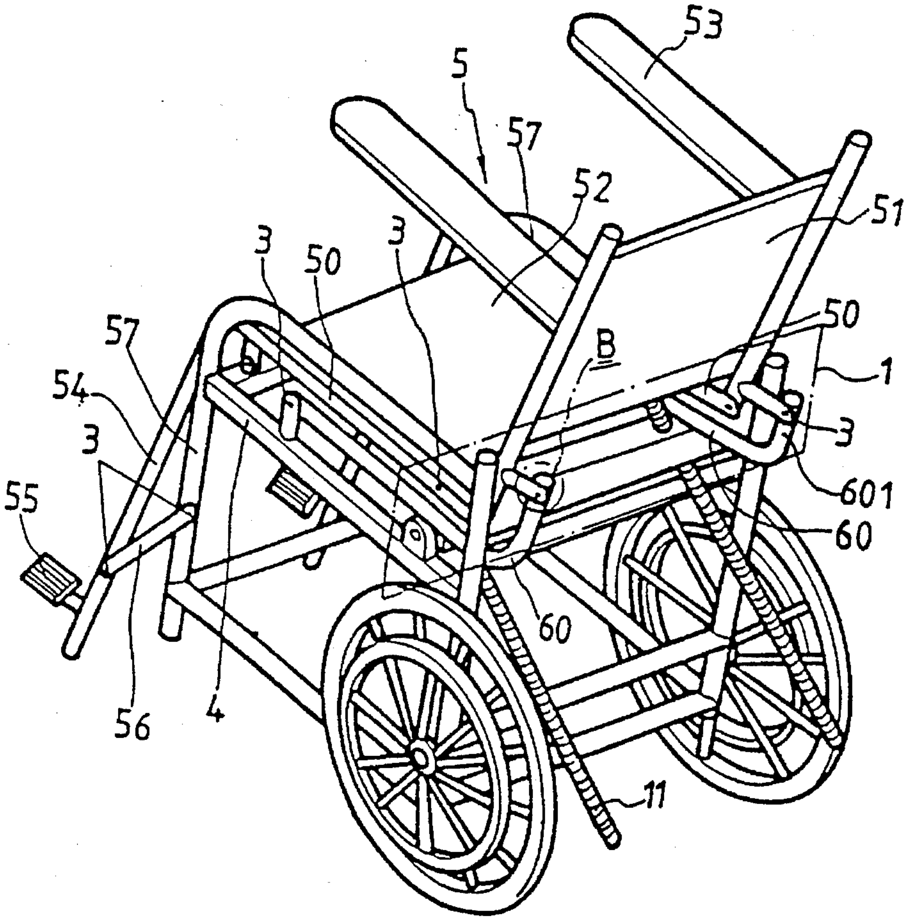
FIG. 1—The stereoscopic structural diagram of this type of new and practical wheel-chair.

The structures of this type of new and practical wheel-chair are detailed as follows (see FIGS. 1 to 8):

This type of practical wheel-chair is equipped with a main frame foundation with two rollers; Above the main frame foundation (4) is a chair-like sitting block (5), which consists of a backing plate (51), a sitting plate (52) and two arm-rest plates (53); the drive-gear (1) is placed under the rear part of the sitting block (5); the two pedal-rods (54) placed before the sitting block are symmetrically hinged to the front part of the sitting plate (52); the characteristics of the chair are; the chair-like sitting block (5) is hinged to the backing plate (51), the back part of which is hinged to the upper parts of two rods curved upwards of the two "L-shape" supporting rod (60) placed symmetrically; the "L-shape" supporting rod (60) is placed under the sitting plate (52) and parallel to it; the front end of the supporting rod (60) is hinged to the vertical rod (411) of the beam column on the frame foundation (4); the supporting rod (501) extending downwards on the front of two symmetric sides of the sitting plate (52) is hinged to the upper flank of the front main frame foundation (4); the transverse worm (13) of the drive-gear is placed in the bearing pedestal (12) placed on the back of the main frame foundation (4); the transverse worm (13) is driven by the motor M; the worm-gear (17) gearing into the transverse worm screw is placed in the gear-box (2) having the two worm extensions which are extended from the transverse worm; there are two inclined screw control rack (11) falling in the worm-gear's (17) inner hole with spiral thread (19); the upper end of screw control rack (11) is hinged to the middle of the side rod (50) which is jointed into the flank of the sitting plate (52), as shown in FIGS. 1 through 4.

Figure 2:
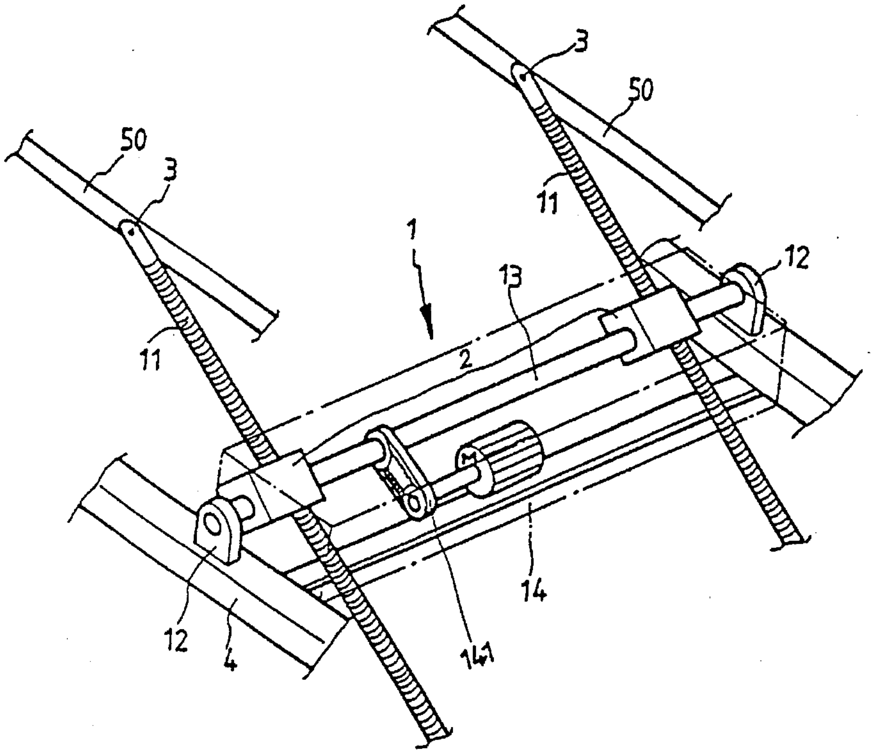
FIG. 2—The structural magnifying diagram of the screw control rack connected with the sitting block in FIG. 1.
Figure 3:
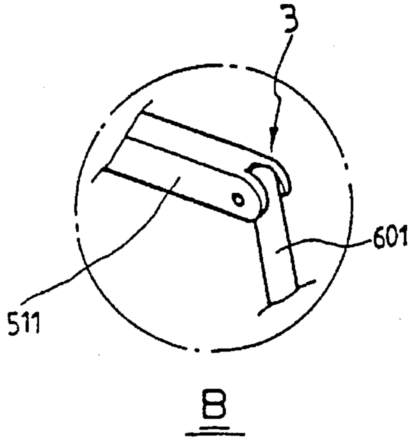
FIG. 3—The structural magnifying diagram of part B in FIG. 1.
Figure 4:
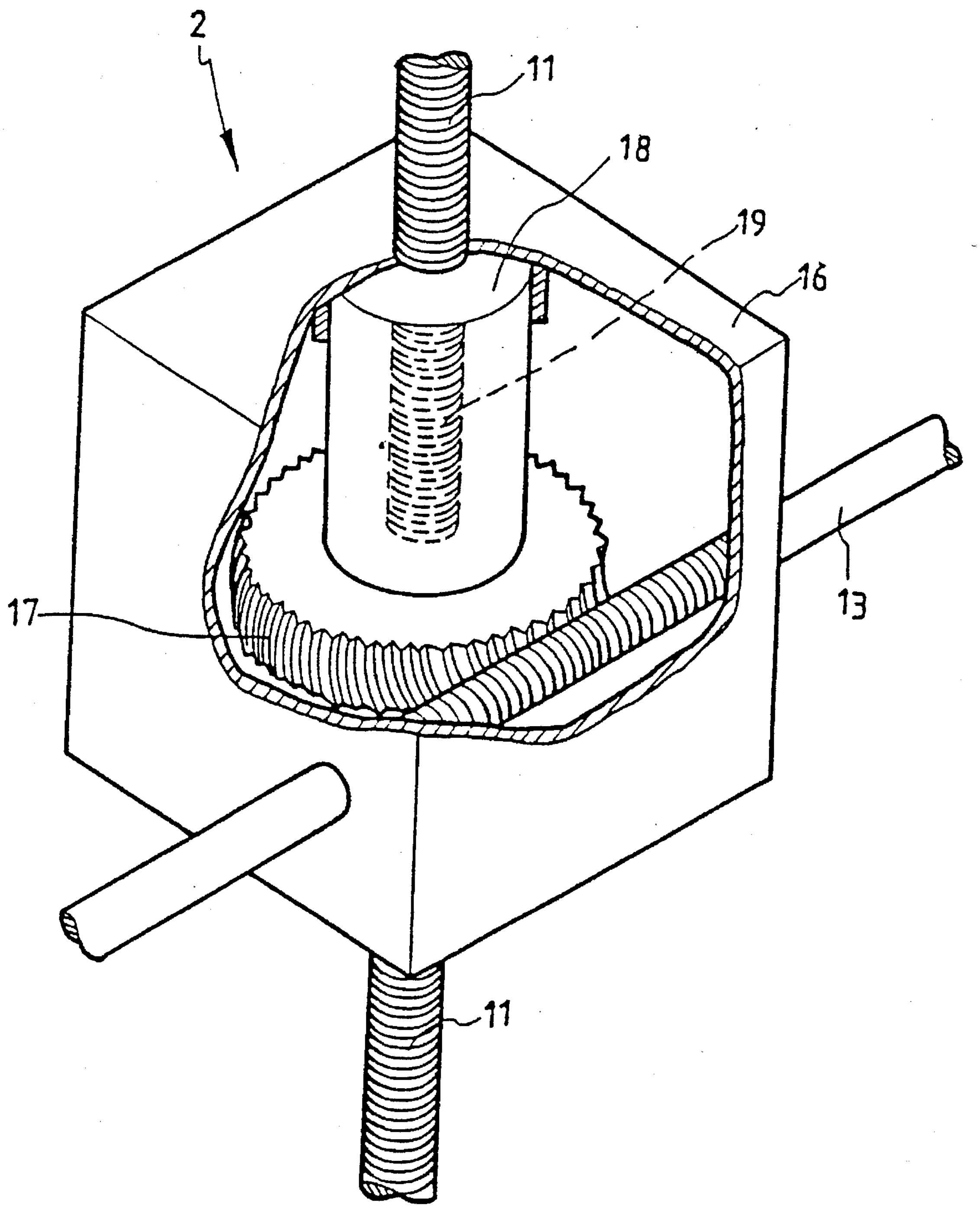
FIG. 4—The structural magnifying diagram of the gear-box in FIG. 2.

The structural features of this type of new and practical wheel-chair consist yet in: there are two horizontal probe-rods (511) under the rear part of the sitting plates (51) of the chair-like sitting block (5); the back ends of the horizontal probe-rods (511) are hinged with the upper end of the part of the "L-shape" supporting rod (60) which curves upward (601); the from of the probe-rod is drooping and is parallel to the side-rod (60) of the sitting plate (52) with some span, the end of the front probe-rod is hinged to the end of the upper part of the vertical column (411) on the frame foundation (4), the lower part of the side-rod's (50) from part is hinged with a vertical supporting rod (501) extending downwards, the lower part of the supporting rod (501) is hinged to the from of the upper part of the main frame foundation (4); the lower parts of the two drooping floor sheets are hinged to the middle of the vertical front column (57) of the main frame foundation by a hinged rod (56); the motor M of the drive-gear drives the transverse worm (13) by the decelerating gear; the transverse worm (13) and inclined control rack (11) are contained in the gear box (2); the gear box, the transverse worm and the motor are all contained in the protective case (14) as shown in FIGS. 1, 2 and 4.

Figure 5:
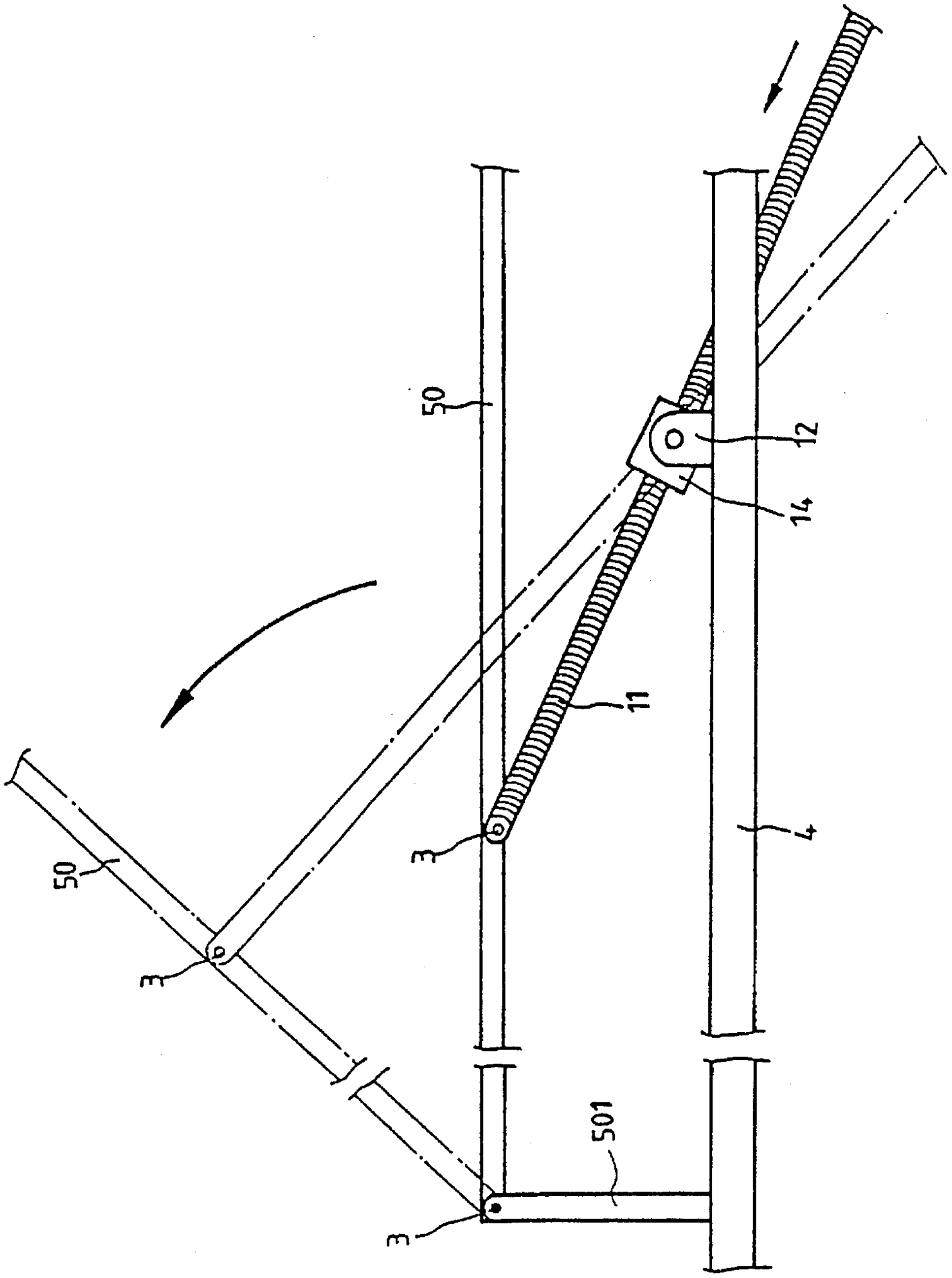
FIG. 5—A-direction view of FIG. 2.

The adjacent rods are hinged with a pin shaft (3) at the anchor point; the upper part of the control rack (11) is hinged with the back half of the symmetric side-rod (50) of the sitting plates (52); the lower part of the screw control rack is free and can ascend or retract by the drive of worm-gear (refer to FIGS. 4 and 5). There are two floor sheets located at the front of the drooping pedal-rod's lower part; the height of the lowest point A, which the drooping pedal-rod (54) can reach while moving, is lower than that of the lowest point B of the smaller wheel's rim.

Figure 8:
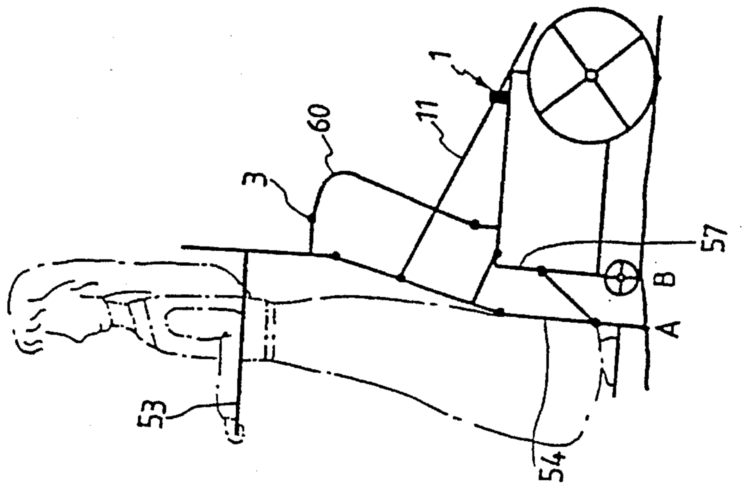
FIG. 6, FIG. 7, FIG. 8—Sketches of different sitting postures for this type of new and practical wheel-chair.
Figure 7:
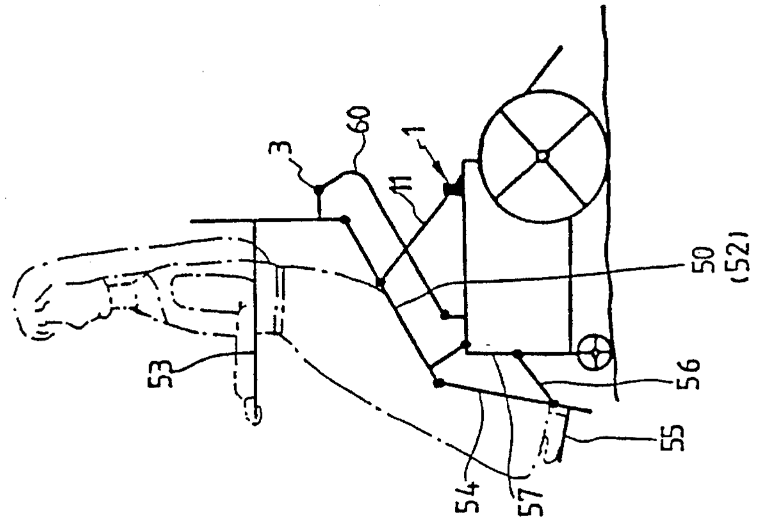
Figure 6:
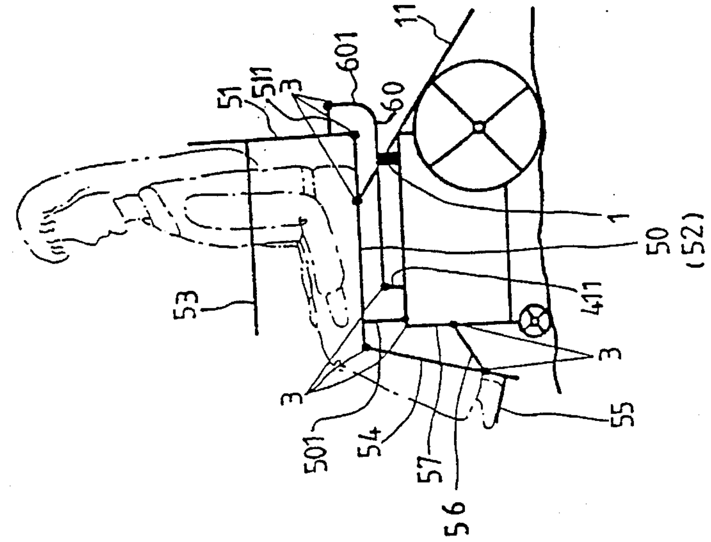

The working principle of this type of new practical wheel-chair is shown in FIGS. 6 to 8. FIG. 6 shows its normal sitting posture, at this time, "L-shape" supporting rod (60) and sitting plate (52) are in the horizontal position, backing plate (51) is at right angle with the sitting plate (52).

If the users desires to change the sitting posture, first user should open the starting pushbutton of motor M, so that the transverse worm is driven by the motor, the screw control rack (13) outstretches upwards and the sitting plate (52) is pushed up gradually, as shown in FIG. 7; the inclination angle of the sitting block can be changed by the button. The maximum inclination position of the sitting plate is shown in FIG. 8. At this time, the sitter can stand up and pick up something, or go to the ground by the use of a cane. If he wants to return to the sitting chair, first he should stand steadily, and then push the inverse-button so that the screw control rack retracts and the sitting plate draws back to the proper position.

I claim:

1. A multi-function electric wheel-chair comprising a main flame foundation (4) with a big-sized roller, a front portion, a back portion, an upper flank, and an upper beam with a vertical rod (411);

a chair-like siring block (5) disposed above said main frame foundation (4), said sitting block comprising a backing plate (51), a sitting plate (52) and two arm-rest plates (53), said sitting plate having two sides;

a driving gear (1) placed under a rear part of said sitting block;

two pedal-rods (54) placed in front of said sitting block (5) said pedal-rods being symmetrically hinged to a front portion of said sitting plate (52) said electric wheel-chair being further characterized in that;

said sitting plate of said chair-like sitting block (5) is hinged to said backing plate (51);

two L-shaped supporting rods (60) placed under said sitting plate (52) and parallel to it, a front end of each of said supporting rods (60) is hinged to said vertical rod (411) of said upper beam on said main frame foundation (4), said supporting rod (60) is joined into one of the sides of the sitting plate (52);

said supporting rods (50) are extended downwardly on a front of two symmetric sides, respectively, of said sitting plate and are hinged to said upper flank of the front portion of said main frame foundation;

said drive-gear has a transverse worm (13), which is set in the bearing pedestal (12) placed on the back portion of said main frame foundation;

said transverse worm (13) is driven by a motor (M) via a worm-gear (13), which is placed in a gear box of two extending parts extended from said transverse worm;

two inclined screw adjustable racks (11) with spiral thread are placed inside an inner hole of said worm-gear, each of said screw adjustable racks has an upper end which is hinged to a middle portion of the side supporting rod (50).

2. A multi-funtion electric wheel-chair according to claim 1 which is further characterized in that:

there are two horizontal probe-rods (511) under the rear part of the sitting plate (51) of the chair-like sitting block (5);

the back end of the horizontal probe-rods (511) is hinged with the upper end of the curved part (601) of the L-shaped supporting rods (60);

the front end of the probe-rod is impending and is parallel to the side-rod of the sitting plate; the front end of the probe-rod is hinged to the end of the upper part of the vertical column (411) on the main frame foundation (4), the lower part of the side-rods (50) front part is hinged with a vertical supporting rod (501) extending downwards;

the lower part of the supporting rod (501) is hinged to the front of the upper part of the two main frame foundation (4); the lower parts of the two hanging down pedal-rod are hinged with the middle of the vertical front column (57) of the main frame foundation by a hinging rod (56);

the motor M of the drive-gear drives tranverse worm (13) by a decelerating gear pair (141); the transverse worm (13) and the inclined screw adjusting rack (11) are contained in a gear box (2); and the gear box (2), the transverse worm (13) and the motor (M) are contained in a protective case (14).

3. A multi-function electric wheel-chair according to claim 2 which is further characterized in that:

the upper part of the screw adjustable rack (11) is hinged to a middle portion of the supporting side rod (50), which is affixed to one of the sides of the sitting plate (52);

the lower part of the screw adjustable rack (11) is freely telescopic and can ascend or retract under the drive of the worm-gear (17).

4. A multi-function electric wheel-chair according to claim 2 which is further characterized in that:

there are two two small front wheels, and foot rests (55) located at the front of the lower part of the pedal rods (54); wherein said pedal rods are constructed such that their lowest point (A) can be adjusted to reach below the lowest point of the front wheels (B).

5. A multi-fumction electric wheel-chair comprising:

a main frame foundation having two rollers, a front portion, a back portion;

a chair-like sitting block (5) placed above the main frame foundation (4), the sitting block comprising a backing plate (51), a sitting plate (52) and two arm-rest plates (53);

a drive-gear (1) is placed under a rear part of the sitting block (5);

two pedal-rods (54) placed in front of the sitting block which are symmetrically hinged to a front part of the sitting plate (52);

the wheel-chair is characterized in that:

two L-shaped supporting rods (60), each having an upper part which curved upwards;

the chair-like sitting block (5) is hinged to the backing plate (51), the backing plate has a back part which is hinged to the upper part of the two L-shaped supporting rods (60) which curve upwards;

each of the L-shaped supporting rods (60) is placed under the sitting plate (52) and parallel to the sitting plate;

the front end of the L-shaped supporting rod (60) is hinged to a vertical rod (411) of a beam column on the frame foundation (4);

an extended supporting rod (501), which extends downwardly on the front of two symmetric sides of the sitting plate (52), is hinged to an upper side of the front portion of the main frame foundation (4);

a transverse worm (13) of a drive-gear which is placed in a bearing pedestal (12) placed on the back portion of the main frame foundation (4), the transverse worm (13) is driven by a motor (M);

a worm-gear (17) which is placed in a gear-box (2) having two worm extensions that are extended from the transverse worm;

two inclined screw control racks (11) with spiral thread (19) which are placed inside an inner hole of the worm-gear (17), each of the screw control racks (11) has an upper end which is hinged to a middle portion of a side rod (50), which is joined into one side of the sitting plate (52).

6. A multi-fumction electric wheel-chair according to claim 5 which is further characterized in that:

two horizontal probe-rods (511) placed under a rear part of the sitting plates (52);

each of the horizontal probe-rods (511) has a back end which is hinged with the upper end of the part of the "L-shape" supporting rod (60) which curves upward (601);

the probe-rod has a front end which is hanging and is parallel to the side-rod (60)

of the sitting plate (52) with a predetermined span, the front end of the probe-rod is hinged to the end of the upper part of the vertical rod (411) on the frame foundation (4);

the side-rod (50) has a lower part, whose front part is hinged with a vertical supporting rod (501) extending downwardly, the lower part of the supporting rod (501) is hinged to the front of the upper part of the main frame foundation (4);

two foot rests having lower parts, repectively, which are hinged to the middle of a vertical front column (57) of the main frame foundation by a hinged rod (56);

the motor (M) of the drive-gear drives the transverse worm (13) via a decelerating gear pair (141);

the transverse worm (13) and inclined screw control rack (11) are contained in the gear box (2); and the gear box, the transverse worm and the motor are all contained in a protective case (14).

7. A multi-function electric wheel-chair according to claim 5 which is further characterized in that:

the side rod (50) and the inclined screw control rack (11) are hinged together by a pin shaft (3) at the anchor point in such a manner that an upper part of the inclined screw control rack (11) is hinged with a back half of the side rod (50) of the sitting plates (52) so as to allow a lower part of the screw control rack to ascend or retract by the worm-gear.

* * * * *